Sept. 11, 1934.  C. A. WOODROW  1,973,242
PROTECTION OF ELECTRIC SYSTEMS
Original Filed Sept. 10, 1932
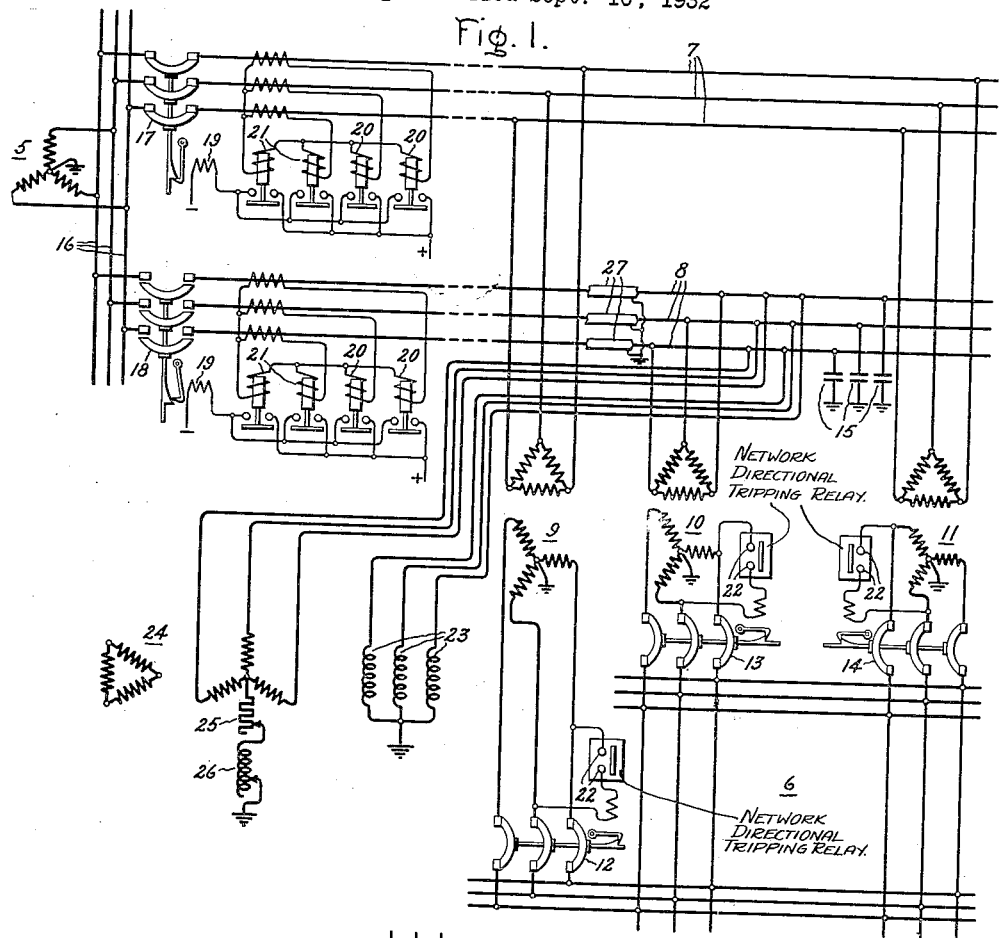
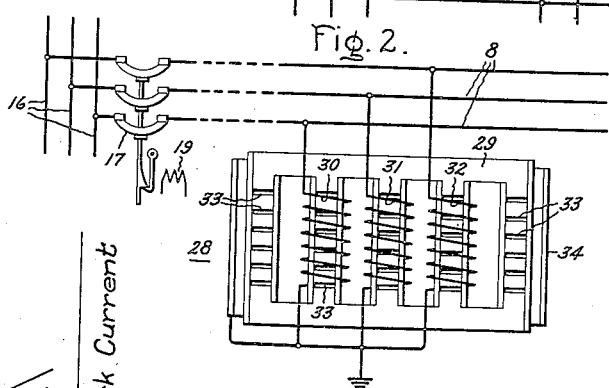
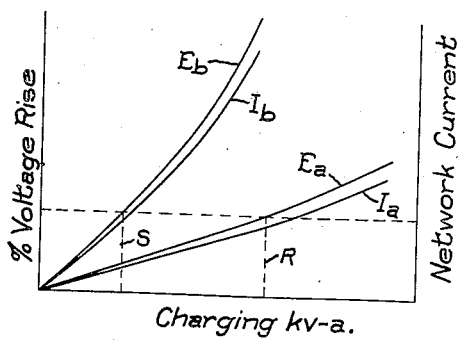
Inventor:
Charles A. Woodrow,
by Chas. E. Mullen
His Attorney.

Patented Sept. 11, 1934

1,973,242

UNITED STATES PATENT OFFICE.

1,973,242

PROTECTION OF ELECTRIC SYSTEMS

Charles A. Woodrow, Schenectady, N. Y., assignor to General Electric Company, a corporation of New York Application September 10, 1932, Serial No. 632,579
Renewed December 16, 1933

8 Claims. (Cl. 172—237)

My invention relates to improvements in the protection of electric systems and more particularly alternating current electric systems wherein a load circuit may be supplied from a grounded neutral source or sources over a plurality of feeders at least one of which is of relatively high voltage and high capacitance, and is normally isolated from ground when disconnected from the source.

In recent years there has been developed a system of alternating current distribution commonly known as the low voltage network system. In this system, which is particularly applicable to metropolitan districts involving concentrated loads, a source is connected to the network through high-voltage feeders and step-down transformers which, in a three-phase system, are usually delta-connected to the feeders. At the source station there is a grounded neutral and protective means including a circuit breaker for disconnecting a feeder from the source on the occurrence of a fault on the feeder. Consequently, when a feeder is disconnected from the source, it is isolated from ground except in case of a ground fault. Inasmuch as the system is peculiarly adapted for use in congested areas, it is practically necessary to place the feeders, transformers and network protective equipment underground. Vaults are used for the transformers and network protectors each of which includes a circuit breaker and a directional tripping relay operative on back-feed, that is, power flow from the network to the feeder to open the circuit breaker. The feeders are underground cables and often so long as to have a relatively high capacitance. In some cases a polyphase cable is used, one example of such cable being disclosed in United States Letters Patent 1,199,789. This cable, which is sometimes called the Hochstadter cable is electrically the equivalent of three single-cored cables since each phase conductor has its own ground shield.

For the purpose of testing the operation of the many network protective equipments of a single feeder, it is normal practice for the operator at the source station periodically to disconnect the feeder at the station. If the network protective equipments are in proper operating condition their protective tripping relays are then operated by the back-feed of power required to energize the network transformers and operate to disconnect the feeder from the network. However, if one of the network protectors should fail to function properly, it then becomes necessary for someone to find the vault where the improperly operating protector is located. This protector must then be opened by hand and the equipment repaired. Thus it is possible for a balanced back-feed, that is, a back-feed caused by other than feeder faults, to exist for an appreciable time. Again inasmuch as there is usually more than one connection from a feeder to the network and the connections are at different points, it is quite unlikely that all properly operating network protectors on a single feeder will operate simultaneously on back-feed. Consequently, because of the high capacitance of the feeder, there may be a very large balanced capacitance current load of comparatively short or long duration. Such a current working through the inductance of a single relatively small transformer and the network tends to produce over-voltages dangerous to lamps and other loads especially in that portion of the network adjacent the last protector to operate as well as to the feeder itself. Generally, the higher the operating voltage and the greater the length of the feeder are, the higher and therefore more dangerous are these overvoltages.

In case of a ground fault on the feeder the protective means at the source station operate to disconnect the feeder from the source. Since the feeder is then isolated from ground except at the ground fault, no ground fault current except that due to the unbalanced capacitance to ground of the ungrounded feeder conductors can flow. The voltage to ground of the ungrounded feeder conductors therefore immediately tends to rise to at least delta voltage above ground. Consequently, there may be a large unbalanced capacitance current back-feed from the network to the feeder which lasts as long as the circuit breaker of a single network protector remains closed. In this case the overvoltages are more severe because of the increase in voltage to ground of the ungrounded conductors without any change in capacitance. These dangerous overvoltages may exist for some time especially if a network protector fails to function properly and requires an operator's presence to open its circuit breaker. Because of this time which has been arbitrarily adopted for some systems as one hour, the problem of limiting the fault current and voltages becomes more difficult by reason of the limitations on heat dissipation from apparatus in vaults.

Under either balanced or unbalanced back-feed, the capacitive current greatly alters the power factor of the circuit. Since the directional tripping relays, which control the network circuit breakers, operate in dependence on the current and both the magnitude and sign of the power factor and are expected to function on a small magnetizing current back-feed as well as a large fault current back feed, it will be apparent that there is a very wide range both in current and power factor over which they must operate, particularly if large capacitance currents are involved. Obviously this complicates the problem of satisfactory protective relaying.

One object of my invention is to provide means for preventing the dangerous voltages which tend to occur by reason of the high capacitance of the feeder or feeders under both balanced and unbalanced back-feed. Another object of my invention is to improve the power factor of the circuit as an aid to better relaying. Further objects of my invention will hereinafter appear.

My invention will be better understood from the following description when considered in connection with the accompanying sheet of drawing, and its scope will be pointed out in the appended claims.

In the accompanying sheet of drawing, Fig. 1 illustrates diagrammatically an embodiment of my invention as applied to a low-voltage network system. Fig. 2 illustrates a modification of my invention, and Fig. 3 is a curve diagram explanatory of my invention.

In Fig. 1, for purposes of illustration, I have shown my invention as applied to a three-phase low-voltage alternating current network system although it will be clear from what follows that the application of my invention is not so limited. As illustrated, the system comprises a source 5 which is connected to a load circuit such as the network 6 through a plurality of relatively high voltage feeders 7 and 8, step-down transformers 9, 10 and 11, and network circuit breakers 12, 13 and 14. Often at least one of the feeders 8, which may be a cable, has a relatively high capacitance schematically illustrated by the condensers 15. These condensers are intended to illustrate both the capacitances between conductors as well as the capacitances to ground of the respective conductors. The source 5 has a grounded neutral, as shown. The transformers 9, 10 and 11 are delta-connected to the feeders. Each feeder may have one or more connections to the network. At the source station indicated by the bus 16 the feeders are provided with circuit breakers 17 and 18 having trip coils 19 under the control of suitable protective relay means which are responsive to faults on the feeder and which are illustrated as phase and ground fault over-current relays 20 and 21 respectively. The circuit breakers 17 and 18 may also be manually controlled to disconnect a feeder whenever desired, as is well known to the art. The directional network tripping relays for controlling the circuit breakers 12, 13 and 14 are only schematically indicated by their contacts 22 and the necessary legends since their application is well known to the art. For the purpose of more clearly explaining my invention the feeder circuit breaker 18 is shown open and it is assumed that only one network circuit breaker 13 is closed on this feeder.

In accordance with my invention, I provide means which is connected between the feeder 8 and ground, and which has an inductance so proportioned as to prevent abnormal voltage rises on the occurrence of a ground fault on the feeder, and also due to the balanced capacitive current taken by the feeder when disconnected from the source 5 and supplied from the feeder 7 through the network 6. As shown in Fig. 1, this means includes two current limiting devices such as a three-phase reactor 23 and a three-phase Y-delta transformer 24. The windings of the reactor 23 are connected between the phase conductors of the feeder 8 and ground. The Y-connected windings of the transformer 24 are connected to the phase conductors of the feeder 8 and the neutral is connected to ground either directly or through current limiting means, such as the resistor 25 and the inductance 26, both of which may be adjustable, as shown. The delta winding of the transformer is closed to permit circulation of the third harmonic or multiples thereof and also to limit ground current flow.

In accordance with my invention the reactor 23 is so proportioned as to compensate the capacitance current to such an extent as to prevent dangerous over-voltages, particularly on balanced back-feed to the feeder 8 when the feeder breaker 18 is open and the feeder is supplied from the feeder 7 through the network 6, the circuit breaker 13 and the transformer 10. For a given set of conditions involving the use of a three-phase cable, each of whose phase conductors has its own ground shield, as indicated at 27, the rise in voltage between the feeder phase conductors and the variation in current fed from each phase conductor of the network to the disconnected feeder 8 in terms of the charging Kv-a, or length of a feeder are shown by the curves $E_a$ and $I_a$ respectively of Fig. 3. Thus, by suitably proportioning the inductance of the reactor 23 the charging Kv-a or effective length of the line can be reduced to the desired value which will, under balanced back-feed, prevent either the feeder rise in voltage or the increase of the current supplied to the feeder by the network from exceeding given values. The values will be determined by the permissible voltage rises on the portion of the network immediately adjacent the network protectors and the magnitudes of the reverse charging current allowable for reasonable relay design.

Assuming now a ground fault on one of the phase conductors of the feeder 8, then immediately upon disconnection of this feeder from the source 5 the voltage to ground of the ungrounded conductors becomes at least $\sqrt{3}$ times what it was before the disconnection. Consequently, without any change in the capacitance of the feeder but with such an increase in voltage, the voltages between the ungrounded conductors and the grounded conductors are much greater than in the case of balanced back-feed, as is shown by the curve $E_b$ of Fig. 3. Similarly, the charging current supplied from the corresponding phase conductors of the network is greater, as shown by the curve $I_b$. The voltage rise between the two ungrounded conductors will be represented very closely by the curve $E_a$, as in the case of the balanced back-feed and the current supplied to the feeder by the third phase conductor of the network will be represented very closely by the curve $I_a$, also as in the case of the balanced back-feed.

Therefore, in accordance with my invention, I further design the transformer 24 so that it cooperates with the reactor to limit the charging current to ground and thereby to reduce the abnormal voltages and the charging current back-feeds from the network. Thus, if the reactor 23 is proportioned for a given charging Kv-a to limit the percentage voltage rise to the value R, then the transformer impedance, together with the reactor impedance, may be such as to limit the voltage rise to the same value under ground fault conditions. For this purpose it will be necessary to so proportion the transformer as to, in effect, reduce the given charging Kv-a under ground fault conditions by the amount indicated between the two vertical lines R and S. While it is not absolutely necessary that the voltage rises in case of ground fault be limited to the same value as in the case of balanced back-feed, nevertheless as a practical matter it is desirable.

One way in which the suitable proportioning of the impedance of a transformer and reactor combination may be considered is on the basis of their positive, negative and zero phase sequence impedances. The positive and negative phase sequence impedances of a given static device are equal. These could be made anything desirable according to the current limiting effect wanted. However, in accordance with my invention, I arrange to have a definite ratio between the positive or negative phase sequence impedances and the zero phase sequence impedance which will depend upon the length of the feeder in question. This ratio should be greater than one and in general it must be finite. As I now contemplate my invention, a ratio value of about 20 appears to be sufficient to cover any condition likely to be met in practice. Obviously, if the protective apparatus according to my invention is proportioned to take care of the longest section likely to be met with in practice on a given system, then the same apparatus will, of course, afford a higher degree of protection to other shorter sections. While it is not theoretically necessary to apply the same proportioned current limiting means to every feeder of a system, it is obvious that as a matter of practical considerations it may be economical to do so, particularly if the feeders are of about the same length.

While the reactor 23 and the transformer 24 cooperate to limit the ground current and thereby simplify the problem of relaying in so far as it is effected by the magnitude alone of the capacitance current, it will be evident that the impedance means 26 may be used to provide additional impedance and also a variation in impedance, if required. The resistor 25 in the ground circuit of the transformer 24 is of particular advantage in case of ground faults since it introduces a voltage drop whereby to shift the power factor of the circuit and thereby reduce the range in operation over which the network relays 22 must operate. Thus, it is possible with apparatus constructed in accordance with my invention not only to prevent abnormal voltages and excessive capacitive currents but also to simplify the network relaying problem by virtue of reducing the magnitude of the charging current and introducing a power factor change, particularly under ground fault conditions.

In the modification of my invention illustrated in Fig. 2, I have, for simplicity, shown only the bus 16, the feeder 8, its circuit breaker 17 and a single current limiting means 28 which has its impedance values proportioned in accordance with my invention. The specific embodiment of my invention shown in Fig. 2 is the invention of Friend H. Kierstead and is disclosed and specifically claimed in the copending application of said Friend H. Kierstead, Serial No. 663,365, filed March 29, 1933, for protection of electric systems.

As shown in Fig. 2, the impedance device 28 is a device having the combined functions of a reactor and a grounding transformer whose core 29 is provided with five legs, the middle three of which carry windings 30, 31 and 32 respectively connected to the phase conductors of the feeder 8. Each leg of the impedance device 28 may be provided with air gaps 33 for controlling the impedance in accordance with the desired action under both balanced and unbalanced back-feed. The gaps in the outside legs control the zero phase sequence impedance or grounding transformer action. Gaps are also provided in the other legs for the purpose of increasing the normal magnetizing current or decreasing the positive phase sequence reactance. The gaps in all the legs may be varied to change the impedance if desired. A series of gaps, as illustrated, is preferable in order to avoid magnetic fringe effects.

In view of the gaps, flux tends to escape into the iron of the tank, not illustrated in the drawing. This would cause undue heating and might damage the tank. In order to avoid this, the device 28 may be provided with a shield 34 which is in effect a single turn short-circuited winding of comparatively low resistance material, such as copper for example. Although this tends to reduce the zero phase sequence impedance, it introduces a controllable loss effect which is analogous to that of the resistor 25 shown in Fig. 1, whereby to improve the power factor from the relaying standpoint at least.

Thus, normally the impedance device 28 acts as a balanced shunt reactor at comparatively low loss and on the occurrence of balanced back-feed compensates the high capacitive currents of the feeder to prevent undue voltage rises. On ground faults most of the residual or zero phase sequence flux threads the gaps in the outer legs. The gap reluctance accordingly controls the reactance so that the voltage rise can readily be limited to the value chosen for the balanced back-feed condition. The phase sequence impedances of the device 28 can readily be so proportioned for operation in accordance with my invention as to limit the voltage rise to 20% phase to phase overvoltage and the device made to withstand this over-voltage without dangerous heating for an hour on a line to ground fault on an otherwise ungrounded system.

While I have shown and described my invention in considerable detail, I do not desire to be limited to the exact arrangements shown, but seek to cover by the appended claims all those changes and modifications that fall within the true spirit and scope of my invention.

What I claim as new and desire to secure by Letters Patent of the United States is:

1. In combination, an alternating current load circuit, a source of alternating current, a feeder having capacitance, means for connecting said feeder to said source and to said load circuit, other means for feeding said load circuit and means connected between said feeder and ground having an impedance so proportioned as to limit to a predetermined value the rise in voltage on the occurrence of a ground fault on the feeder and also the rise in voltage due to the balanced capacitive current taken by the feeder when disconnected from the source and supplied from said other feeding means through the load circuit.

2. In combination, an alternating current load circuit, a source of alternating current having a grounded neutral, an ungrounded feeder, means for connecting said feeder to said source and to said load circuit, other means for feeding said load circuit and means connected between said feeder and ground having an impedance so proportioned as to prevent abnormal voltage rises on the occurrence of a ground fault on the feeder and also due to the balanced capacitive current taken by the feeder when disconnected from the source and supplied from said other feeding means through the load circuit.

3. In combination, a source of three-phase alternating current having a grounded neutral point, a plurality of feeders, means for connecting the feeders to the source, a network of lower voltage than said feeders, means for connecting the network to the feeders including transformers delta-connected to the feeders and circuit interrupting means on the network side of the transformers, and means connected between a feeder and ground having an impedance so proportioned as to limit to a predetermined value the rise in voltage on the occurrence of a ground fault on the feeder and also the rise in voltage due to the balanced capacitive current taken by the feeder when disconnected from the source and supplied from another feeder through the network.

4. In combination, a source of three-phase alternating current having a grounded neutral point, a plurality of feeders at least one of which has a relatively high capacitance, means for connecting the feeders to the source, a network of lower voltage than said feeders, transformers for connecting the network to the feeders including a transformer delta-connected to said high capacitance feeder, circuit interrupting means on the network side of said transformer and means connected between said high capacitance feeder and ground having an impedance so proportioned as to limit to a predetermined value the rise in voltage on the occurrence of a ground fault on the high capacitance feeder and also the rise in voltage due to the balanced capacitive current taken by the feeder when disconnected from the source and supplied from another feeder through the network.

5. In combination, a source of three-phase alternating current having a grounded neutral point, a plurality of relatively high voltage feeders having capacitance, means for connecting the feeders to the source, a low voltage network, means for connecting the network to the feeders including transformers delta-connected to the feeders and circuit interrupting means on the network side of the transformers, and current limiting means connected between said high capacitance feeder and ground having equal positive and negative phase sequence impedances of a magnitude sufficient to compensate to a predetermined degree the balanced capacitive current of said feeder and a zero phase impedance of such a value that the ratio of the positive phase impedance and the zero phase impedance is greater than one and less than twenty.

6. In combination, an alternating current load circuit, a source of alternating current, a feeder having capacitance, means for connecting said feeder to said source and to said load circuit, other means for feeding said load circuit and current limiting means connected between said feeder and ground having positive and negative phase sequence impedances so proportioned as to compensate to a predetermined degree the balanced capacitive current of said feeder and zero phase impedance of such a value that the ratio of the positive phase impedance and the zero phase impedance is greater than one and less than twenty.

7. In combination, a source of alternating current having a grounded neutral point, a plurality of high voltage feeders at least one of which is a three-phase cable each phase conductor of which has a grounded metallic shield, means for connecting the feeders to the source, a low voltage network, transformers for connecting the network to the feeders including a transformer delta-connected to said cable feeder, circuit interrupting means on the network side of said transformers and means connected between said cable feeder and ground having an impedance so proportioned as to limit to a predetermined value the rise in voltage on the occurrence of a ground fault on the cable feeder and also the rise in voltage due to the balanced capacitive current taken by the cable feeder when disconnected from the source and supplied from another feeder to the network.

8. In combination, an alternating current load circuit, a source of alternating current, a cable feeder each phase conductor of which is provided with a grounded metallic shield, means for connecting said feeder to said source and to said load circuit, other means for feeding said load circuit and means connected between phase conductors of said feeder and ground having an impedance so proportioned as to limit to a predetermined value the rise in voltage on the occurrence of a ground fault on the feeder and also the rise in voltage due to the balanced capacitive current taken by the feeder when disconnected from the source and supplied from said other feeding means through the load circuit.

CHARLES A. WOODROW.